United States Patent
Kageyama et al.

(10) Patent No.: US 10,227,024 B2
(45) Date of Patent: Mar. 12, 2019

(54) SEAT COVER AND VEHICLE SEAT

(71) Applicant: NHK SPRING CO., LTD., Yokohama-shi (JP)

(72) Inventors: Atsushi Kageyama, Yokohama (JP); Takashi Ono, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/194,259

(22) Filed: Jun. 27, 2016

(65) Prior Publication Data

US 2016/0375807 A1     Dec. 29, 2016

(30) Foreign Application Priority Data

Jun. 29, 2015   (JP) .................................. 2015-130331

(51) Int. Cl.
*B60N 2/58* (2006.01)

(52) U.S. Cl.
CPC ............. *B60N 2/5883* (2013.01); *B60N 2/58* (2013.01)

(58) Field of Classification Search
CPC ...... B60N 2/5883; B60N 2/58; B60N 2/5825; B60N 2/5833; B60N 2/5841; B60N 2/5816; B60N 2/585; B60N 2/5858; B60N 2/5866; B60N 2/5875
See application file for complete search history.

(56) References Cited

U.S. PATENT DOCUMENTS

| | | | | |
|---|---|---|---|---|
| 5,893,579 A | * | 4/1999 | Kimura | B60N 2/5825 280/728.3 |
| 2004/0036329 A1 | * | 2/2004 | Ashton | B60N 2/4817 297/220 |
| 2005/0103247 A1 | | 5/2005 | Hori | |
| 2006/0113756 A1 | * | 6/2006 | Tracht | B60N 2/5883 280/730.1 |
| 2010/0043687 A1 | * | 2/2010 | Evans | B60N 2/58 112/475.08 |

(Continued)

FOREIGN PATENT DOCUMENTS

| JP | 2008-149005 A | 7/2008 |
|---|---|---|
| JP | 2012-176142 A | 9/2012 |

OTHER PUBLICATIONS

Japanese Office Action for Application No. 2015-130331, dated Dec. 11, 2018 in 7 pages (English translation ncluded).

*Primary Examiner* — Timothy J Brindley
(74) *Attorney, Agent, or Firm* — Knobbe, Martens, Olson & Bear, LLP (57) ABSTRACT

A seat cover, comprising: a cover main body that is formed by stitching together a plurality of covering pieces at a plurality of seam allowances, and that covers a padding material of a vehicle seat, with a portion of the plurality of seam allowances disposed at a back face side of the cover main body facing the padding material being turned over to lie along a surface of the padding material; and a low friction cloth that is attached to the back face side of the cover main body in a state straddling across the portion of the plurality of seam allowances, and that is interposed between the cover main body and the padding material, with a surface of the low friction cloth that contacts the portion of the plurality of seam allowances having a lower coefficient of friction than a coefficient of friction of the surface of the padding material.

6 Claims, 11 Drawing Sheets

(56) References Cited

U.S. PATENT DOCUMENTS

| | | | | |
|---|---|---|---|---|
| 2010/0127487 A1* | 5/2010 | Kamo | ................ | B60N 2/5883 |
| | | | | 280/743.1 |
| 2014/0239697 A1* | 8/2014 | Nii | ..................... | B60N 2/58 |
| | | | | 297/452.61 |
| 2015/0291070 A1* | 10/2015 | Kitajima | ................. | B60N 2/58 |
| | | | | 297/452.21 |
| 2015/0336490 A1* | 11/2015 | Nie | ..................... | B60N 2/64 |
| | | | | 297/452.18 |
| 2016/0317047 A1* | 11/2016 | Sugiyama | ............ | A61B 5/6893 |
| 2016/0368405 A1* | 12/2016 | Ishii | .................... | B60N 2/5891 |
| 2017/0113588 A1* | 4/2017 | Ochiai | ............... | B60N 2/5883 |

\* cited by examiner

SEAT COVER AND VEHICLE SEAT

CROSS-REFERENCE TO RELATED APPLICATION

This application is based on and claims priority under 35 USC 119 from Japanese Patent Application No. 2015-130331 filed on Jun. 29, 2015, the disclosure of which is incorporated by reference herein.

BACKGROUND

Technical Field

The present invention relates to a seat cover and a vehicle seat.

Related Art

In a seat cushion employed in a truck seat described in Japanese Patent Application Laid-Open (JP-A) No. 2012-176142, a seat cushion trim cover assembly (seat cover) covers a seat cushion pad (padding material) assembled to a seat cushion frame. The seat cover is divided into gusset covers avoiding at least a boarding and alighting range on a seat side face at the boarding and alighting side. The gusset covers are stitched together using piping or plain seams. In the seat cover, the surface area that is rubbed by the buttocks of an occupant is reduced by inserting stitching in a seating face so as to run from a boarding and alighting range in a seat side face at the boarding and alighting side along the left and right direction in which the buttocks of an occupant move.

Thus, when the occupant boards and alights the vehicle, tearing of the covering, due to the buttocks brushing against the piping or plain seams at the boarding and alighting range of the seat side face on the boarding and alighting side, is prevented, creases and slack are suppressed from developing in the covering, external appearance is not impaired, and long merchantability is secured.

Such seat covers are stitched into a bag shape by stitching together plural covering pieces, formed using cloth, leather, or the like, at seam allowances. The seam allowances of the respective covering pieces are each disposed at a back face side of the seat cover that contacts the padding material. Such seam allowances are, for example, housed inside grooves formed in a surface of the padding material.

However, the above-described grooves are sometimes omitted when a seam of the respective covering pieces is set on one of the styling faces of a vehicle seat (on a same face that is continuous without steps or bends). In such cases, for example, the seam allowances between respective covering pieces are pressed against the surface of the padding material in a state turned over toward one direction to lie along the surface of the padding material. When the body of the occupant repeatedly rubs against a range of the seat cover where such a seam is set, the seam allowances positioned at the back face side of the seat cover repeatedly rub against the surface of the padding material. As a result, the seam allowances sometimes stand up on end, such that leading ends of the seam allowances dig into the surface of the padding material. In such cases, the seam allowances sometimes remain in a stand up state, such that the seam that has been stitched together at the seam allowances bulges out, and issues such as a reduction in the quality of the external appearance of the vehicle seat occur.

In consideration of the above circumstances, an object of the present invention is to obtain a seat cover and a vehicle seat capable of preventing or suppressing seam allowances between covering pieces, which are seam allowances turned over to lie along a surface of a padding material, from remaining in a stand up state, even in cases in which the seam allowances have been stand up unintentionally.

SUMMARY

A seat cover of the first aspect of the present invention, comprising: a cover main body that is formed by stitching together a plurality of covering pieces at a plurality of seam allowances, and that covers a padding material of a vehicle seat, with a portion of the plurality of seam allowances disposed at a back face side of the cover main body facing the padding material being turned over to lie along a surface of the padding material; and a low friction cloth that is attached to the back face side of the cover main body in a state straddling across the portion of the plurality of seam allowances, and that is interposed between the cover main body and the padding material, with a surface of the low friction cloth that contacts the portion of the plurality of seam allowances having a lower coefficient of friction than a coefficient of friction of the surface of the padding material.

In the seat cover of the first aspect of the present invention, the cover main body is formed by stitching the plural covering pieces together at the seam allowances. In a state in which the cover main body covers the padding material of the vehicle seat, the portion of the plural seam allowances that is disposed at the back face side of the cover main body is turned over to lie along the surface of the padding material. The low friction cloth is attached to the back face side of the cover main body in a state straddling across this portion of the seam allowances. The low friction cloth is interposed between the cover main body and the padding material, and the surface of the low friction cloth that contacts the portion of the seam allowances is set with a lower coefficient of friction than the coefficient of friction of the surface of the padding material. This enables the seam allowances to be returned to their original lying down state due to the seam allowances sliding against the low friction cloth, even in cases in which the portion of the seam allowances has been stand up unintentionally due to the body of the occupant repeatedly rubbing against a surface of the cover main body. This enables the seam allowances to be prevented or suppressed from remaining in a stand up state.

The seat cover of the second aspect of the present invention, wherein: in a state in which the cover main body covers the padding material, a pair of the covering pieces stitched together at the portion of the plurality of seam allowances configures a surface of a side support section disposed at a vehicle width direction outer side of a seat cushion or a seatback of the vehicle seat; and the portion of the plurality of seam allowances extends, at a vehicle width direction intermediate portion of the side support section, along a direction intersecting the vehicle width direction.

In the seat cover of the second aspect of the present invention, the surface of the side support section disposed at the vehicle width direction outer side of the seat cushion or the seatback of the vehicle seat comprise the pair of covering pieces that have been stitched together. The seam allowances at the seam of these covering pieces extend at the vehicle width direction intermediate portion of the side support section along a direction intersecting the vehicle width direction, and are turned over to lie along the surface of the padding material. In such a configuration, the seam allowances are liable to stand up on end due to the body of the occupant repeatedly rubbing against the side support section disposed at the vehicle width direction outer side when the occupant is boarding and alighting the vehicle. However, due to the low friction cloth in the present invention, the stand up seam allowances can be returned to their original lying down state.

The seat cover of the third aspect of the present invention, wherein the low friction cloth is disposed at a length direction intermediate portion of the side support section.

In the seat cover of the third aspect of the present invention, the low friction cloth is provided disposed at the length direction intermediate portion (this being a front-rear direction intermediate portion in the case of a seat cushion, and an up-down direction intermediate portion in the case of a seatback) of the side support section disposed at the vehicle width direction outer side of the seat cushion or the seatback of the vehicle seat. The stand up seam allowances less readily return naturally to their original lying down state at the length direction intermediate portion of the side support section than at either length direction end portion; however, due to the low friction cloth in the present invention, the stand up seam allowances can be returned to their original lying down state.

The seat cover of the fourth aspect of the present invention, wherein each edge of the low friction cloth is sewn together with a seam between the respective covering pieces.

In the seat cover of the fourth aspect of the present invention, edge of the low friction cloth is sewn together with a seam between the respective covering pieces, thereby enabling the attachment operation of the low friction cloth to the cover main body to be completed during the stitching process of the respective covering pieces. This enables sewing to be more efficient.

The seat cover of the fifth aspect of the present invention, wherein the low friction cloth comprises a tricot fabric of synthetic fibers.

In the seat cover of the fifth aspect of the present invention, the low friction cloth comprises an inexpensive tricot fabric of synthetic fibers, thereby enabling a reduction in costs to be achieved.

An vehicle seat of the sixth aspect of the present invention, comprising: at least one of a seat cushion cover to cover a seat cushion pad serving as a padding material of a seat cushion, or a seatback cover to cover a seatback pad serving as a padding material of a seatback, configured by the seat cover of the first aspect of the present invention.

In the vehicle seat of the sixth aspect of the present invention, at least one from out of the seat cushion cover and the seatback cover comprises the seat cover of any one of the first aspect to the fifth aspect, thereby enabling the advantageous effects described above to be exhibited.

As explained above, the seat cover and the vehicle seat according to the present invention enable seam allowances between covering pieces that are seam allowances from out of the seam allowances turned over to lie along a surface of a padding material, to be prevented or suppressed from remaining in a stand up state, even in cases in which these seam allowances have been stand up unintentionally.

BRIEF DESCRIPTION OF THE DRAWINGS

Exemplary embodiments of the present invention will be described in detail based on the following figures, wherein.

DETAILED DESCRIPTION

Explanation follows regarding a seat cushion cover 12 and a seatback cover 14, each serving as a seat cover, as well as a vehicle seat 10 configured including the seat cushion cover 12 and the seatback cover 14, according to an exemplary embodiment of the present invention, with reference to FIGS. 1 to 7. Note that in each of the drawings as appropriate, the arrow FR indicates toward the vehicle front, the arrow UP indicates toward the vehicle upper side, and the arrow OUT indicates outward (toward the left) in the vehicle width direction (vehicle left-right direction). Simple reference to the front-rear, left-right, and up-down directions in the below explanation indicates these directions with respect to the vehicle.

Figure 1:
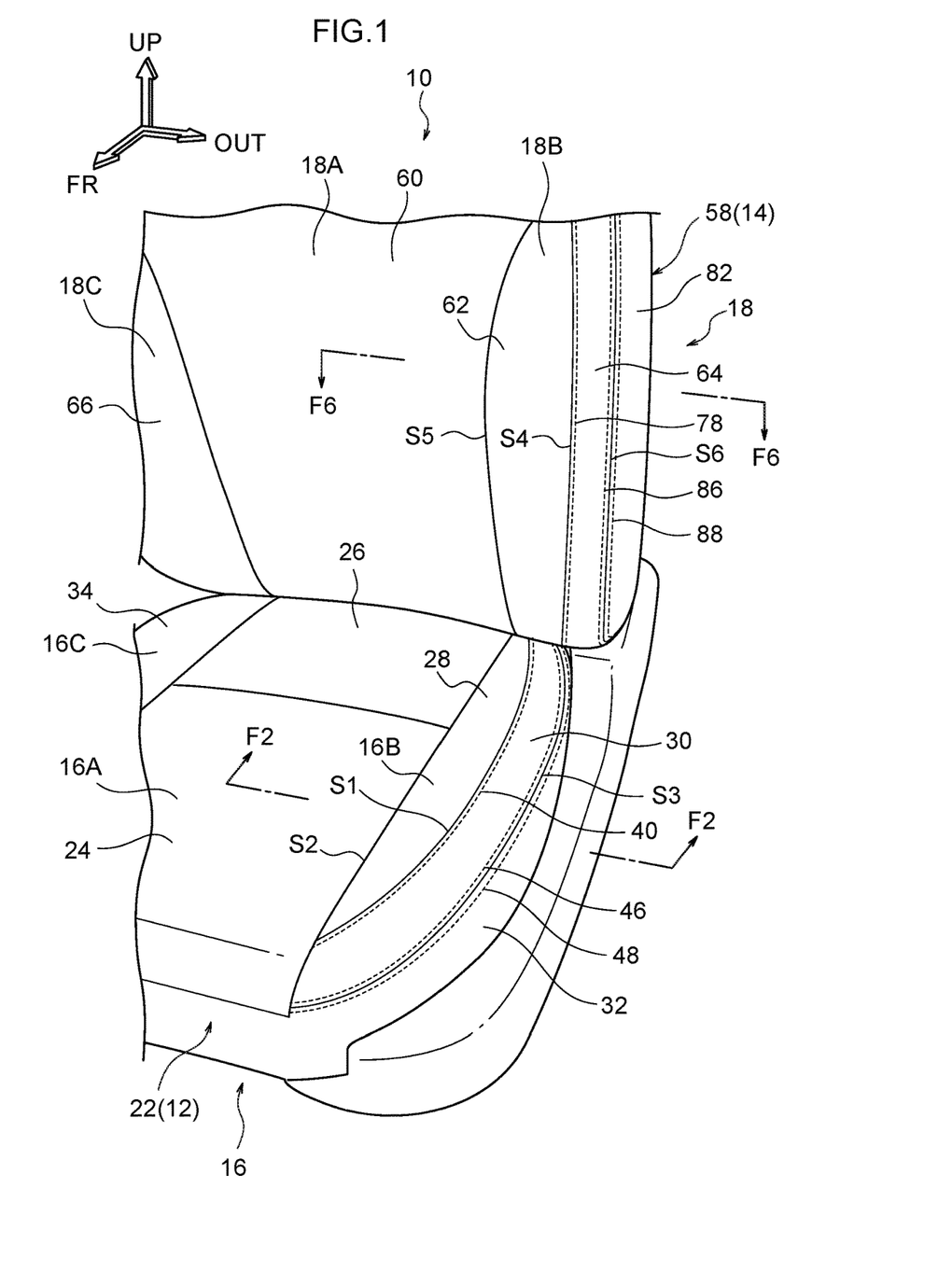
FIG. 1 is a perspective view illustrating a partial configuration of a vehicle seat according to an exemplary embodiment of the present invention.

As illustrated in FIG. 1, the vehicle seat 10 according to the present exemplary embodiment includes a seat cushion 16 on which an occupant sits, and a seatback 18 extending upward from a rear end portion of the seat cushion 16 to form a backrest for the occupant. The vehicle seat 10 is a front seat or a rear seat of the vehicle, and is disposed at the left side inside a vehicle cabin in this case. The front-rear, left-right and up-down directions of the vehicle seat 10 match the front-rear, left-right and up-down directions of the vehicle.

Configuration of Seat Cushion

A seat section 16A that supports the buttocks and thighs of the occupant from the vehicle lower side is provided at a vehicle width direction intermediate portion of the seat cushion 16. Left and right side support sections 16B, 16C are respectively provided at either vehicle width direction side of the seat section 16A. The left and right side support sections 16B, 16C jut out further toward the vehicle upper side than the seat section 16A, and are configured so as to support the buttocks and thighs of the occupant from the sides.

Figure 2:
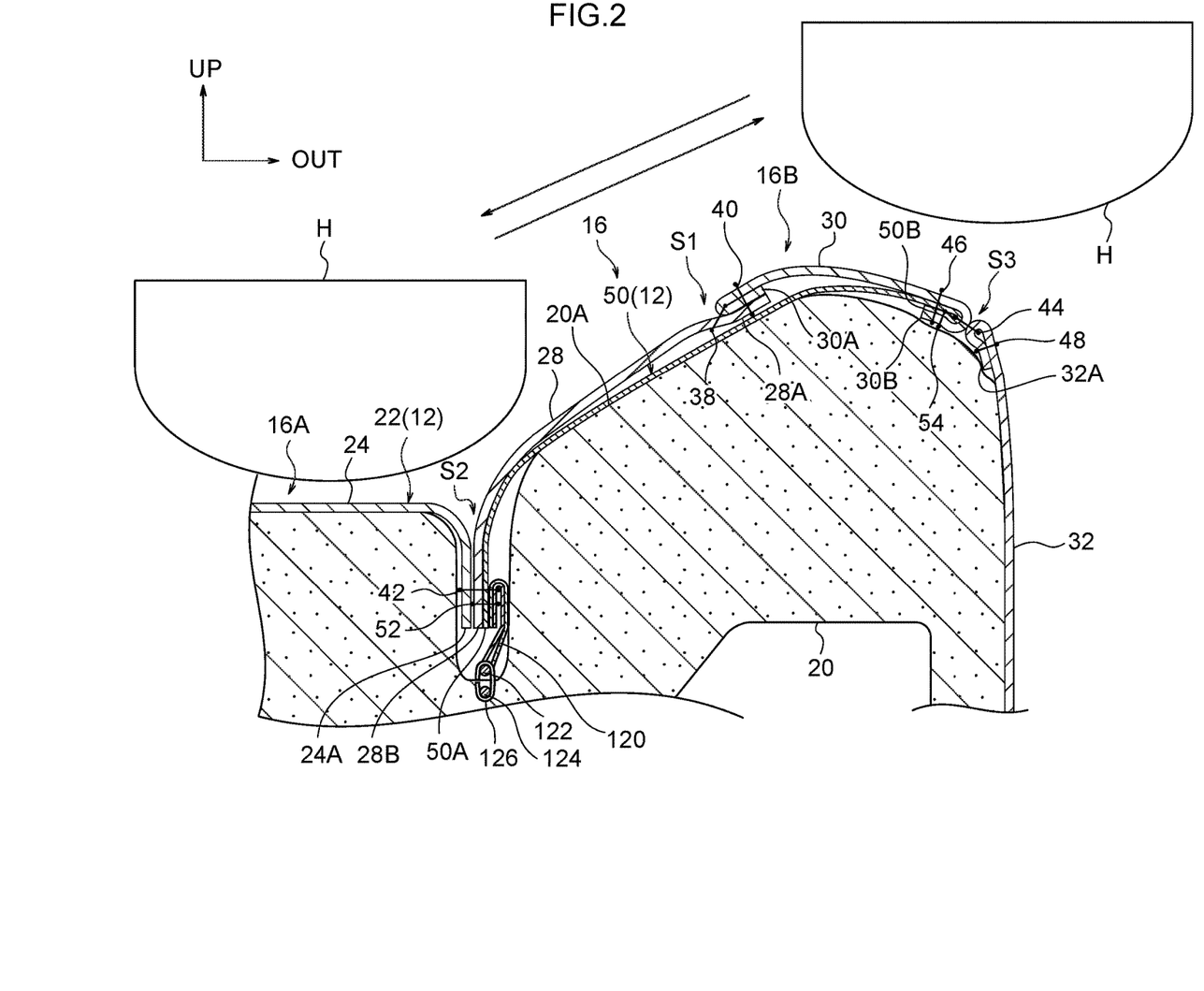
FIG. 2 is a cross-section corresponding to a cross-section sectioned along line F2-F2 in FIG. 1.
Figure 3:
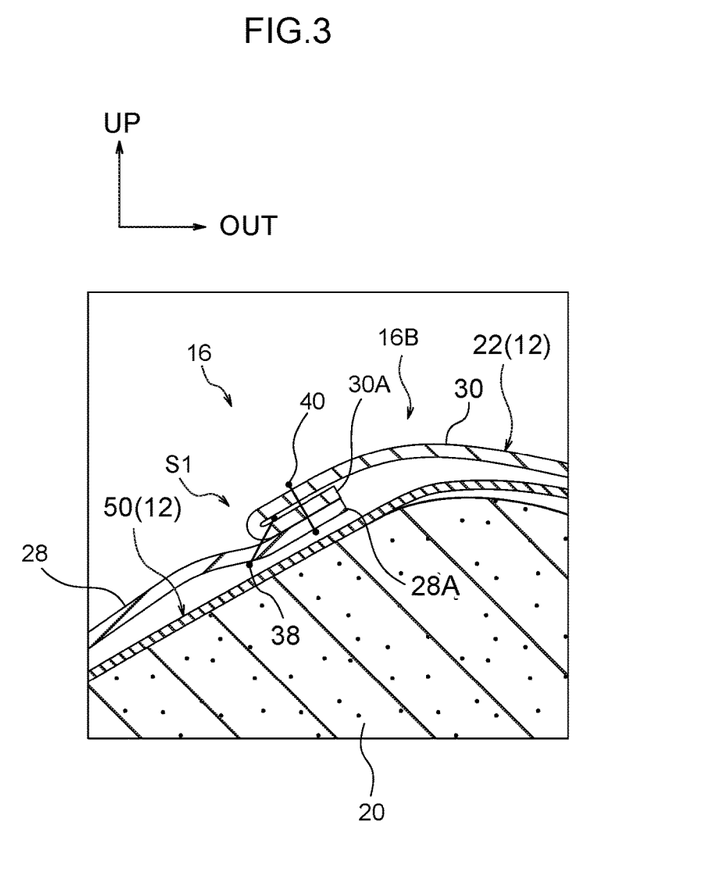
FIG. 3 is an enlarged cross-section of part of FIG. 2.

As illustrated in FIGS. 2 and 3, the seat cushion 16 includes a seat cushion pad 20, this being a padding material (cushioning material). The seat cushion pad 20 is supported by a seat cushion frame, not illustrated in the drawings, configuring a frame of the seat cushion 16. The seat cushion pad 20 is covered by a cover main body 22, configuring a main body section of the seat cushion cover 12.

Figure 4:
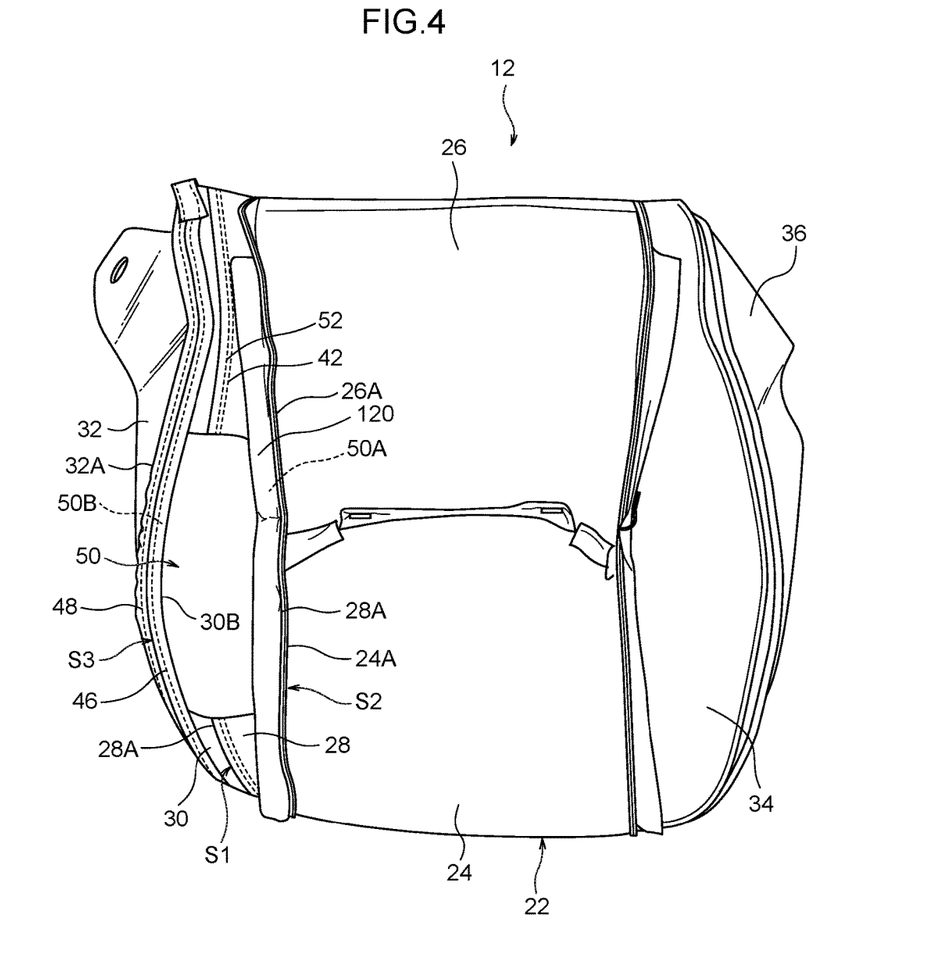
FIG. 4 is a perspective view of a seat cushion cover viewed from a back face side.

The cover main body 22 is formed in a bag shape by stitching together (sewing together) plural covering pieces, including covering pieces 24, 26, 28, 30, 32, 34, and 36 illustrated in FIG. 4, at plural seam allowances disposed at a back face side of the cover main body 22. The cover main body 22 is stitched into a bag shape in a reversed state by stitching together the plural covering pieces together in a reversed state. The front and back of the reversed-state cover main body 22 are then inverted while covering the seat cushion pad 20. Note that cloth, leather, synthetic leather, or another material is applied as the material of the plural covering pieces.

In the state in which the cover main body 22 covers the seat cushion pad 20, a surface (upper face) of the side support section 16B disposed at the vehicle width direction outer side is configured by the pair of covering pieces 28, 30 that are side-by-side in the seat width direction (vehicle width direction). The pair of covering pieces 28, 30 are stitched (joined) together at a seam S1 extending along the length direction of the side support section 16B (vehicle front-rear direction). As illustrated in FIG. 2, a seam allowance 28A provided at a seat width direction outer side edge of the covering piece 28 and a seam allowance 30A provided at a seat width direction inner side edge of the covering piece 30 are overlapped with each other at the seam S1 and stitched together using stitching thread 38. The seam allowances 28A, 30A extend at a vehicle width direction intermediate portion of the side support section 16B along a direction (the vehicle front-rear direction) intersecting the vehicle width direction, and are set at an upper face of the side support section 16B, this being a same styling face that is continuous without steps or bends.

The seam allowances 28A, 30A are turned (folded) over toward the vehicle width direction outer side so as to lie along a surface 20A of the seat cushion pad 20, and are stitched together with a portion of the covering piece 30 that is adjacent to the seam allowance 30A using stitching thread 40. The stitching thread 40 configures single stitching extending in the vehicle front-rear direction along the seam S1, and serving as a decorative stitch enhancing the design of the seat cushion cover 12. Note that a (non-stitched) configuration in which the stitching thread 40 is omitted may be adopted.

From out of the pair of covering pieces 28, 30, the covering piece 28 positioned at the seat width direction inner side is disposed adjacent to the covering pieces 24, 26 configuring a surface of the seat section 16A, and is stitched together with the covering pieces 24, 26 at a seam S2. At the seam S2, a seam allowance 24A provided at a seat width direction outer side edge of the covering piece 24 and a seam allowance 26A provided at a seat width direction outer side edge of the covering piece 26 (see FIG. 4) are overlapped with a seam allowance 28B provided at a seat width direction inner side edge of the covering piece 28, and stitched together using stitching thread 42.

From out of the pair of covering pieces 28, 30, the covering piece 30 positioned at the seat width direction outer side is disposed adjacent to the covering piece 32 configuring a side face of the seat cushion 16, and is stitched together with the covering piece 32 at a seam S3. A seam allowance 30B provided at a seat width direction outer side edge of the covering piece 30 and a seam allowance 32A provided at an upper edge of the covering piece 32 are overlapped with each other at the seam S3 and stitched together using stitching thread 44. The seam allowance 30B of the covering piece 30 is folded back toward the seat width direction inner side, and portions on either side of the fold are stitched together using stitching thread 46. Similarly, the seam allowance 32A of the covering piece 32 is folded back toward the lower side, and portions on either side of the fold are stitched together using stitching thread 48. The stitching threads 46, 48 configure double stitching extending in the vehicle front-rear direction along the seam S3, and serve as a decorative stitch enhancing the design of the seat cushion cover 12.

A low friction cloth 50, configuring the seat cushion cover 12 together with the cover main body 22, is interposed between the pair of covering pieces 28, 30 and the seat cushion pad 20, at a back face side of the pair of covering pieces 28, 30. The low friction cloth 50 is formed by tricot knitting synthetic fibers such as nylon or polyester into an inexpensive tricot fabric that is then cut out into a substantially rectangular shape. Examples of the tricot fabric may include ES1500 (product number: ES1500, Specification: 150 cm width by 100 m length; density: 66 courses×28 wales, weight: approximately 90 grams/m$^2$, and thickness: approximately 0.3 mm), or TF Queens (product number: TF Queens, density: 36 courses×28 wales, weight: approximately 45 grams/m$^2$, and thickness: approximately 0.25 mm) made by Kiryu Tricot Industrial Co., Inc.

The low friction cloth 50 is set with a smaller vehicle front-rear direction dimension than the side support section 16B, and is disposed at a length direction intermediate portion (vehicle front-rear direction intermediate portion) of the side support section 16B. A seam allowance 50A provided at a vehicle width direction inner side edge of the low friction cloth 50 is stitched together (sewn together) with the covering pieces 24, 26, 28 using the stitching thread 42 at the seam S2, and also stitched (stay stitched) together with a seam allowance 28B of the covering piece 28 using stitching thread 52. Note that a hanger pocket 120 is also stitched together using the stitching threads 42, 52 at the seam S2. A wire 122 that extends along the front-rear direction of the seat cushion 16 is inserted through the hanger pocket 120. The wire 122 is coupled and fixed by hog rings 126 to a separate wire 124 extending along the front-rear direction of the seat cushion 16. The wire 124 is embedded in the seat cushion pad 20 by foaming as an integral unit.

A seam allowance 50B provided at a vehicle width direction outer side edge of the low friction cloth 50 is stitched together (sewn together) with the covering pieces 30, 32 using the stitching thread 44 at the seam S3. The seam allowance 50B is also stitched (stay stitched) together with the seam allowance 30B of the covering piece 30 using stitching thread 54, folded back together with the seam allowance 30B of the covering piece 30 toward the seat width direction inner side, and portions on either side of the fold are stitched together using the stitching thread 46.

Thus, the low friction cloth 50 spans between the seams S2, S3. A coefficient of friction of the surface of the low friction cloth 50 that contacts the covering pieces 28, 30, including the seam allowances 28A, 30A, is set to be lower than a coefficient of friction of the surface 20A of the seat cushion pad 20. An example of a method to measure the coefficient of friction may be found in JIS K7125 (coefficient of friction measuring method for plastic film and sheet).

Figure 5A:
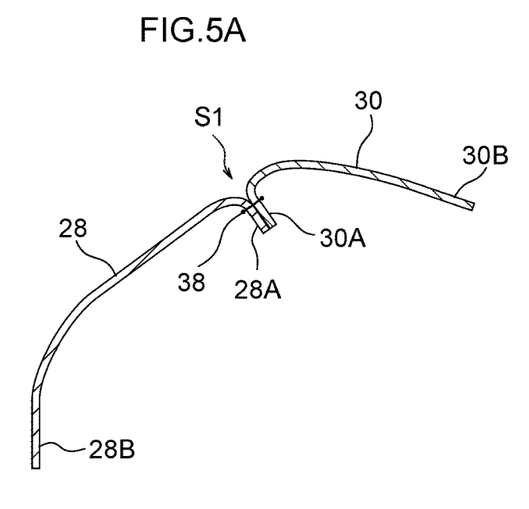
FIG. 5A is a cross-section illustrating a first process of a sewing process of part of a seat cushion cover.
Figure 5B:
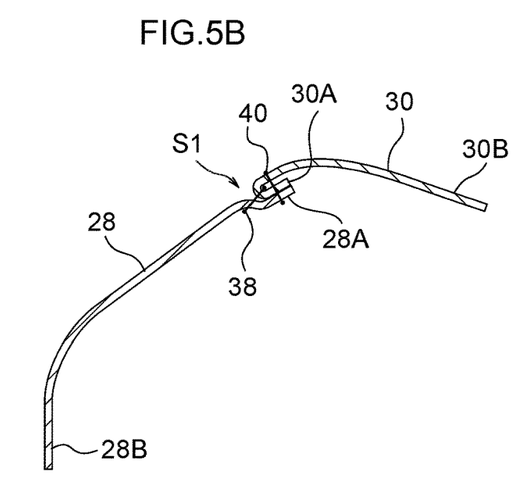
FIG. 5B is a cross-section illustrating a second process of the same sewing process.
Figure 5C:
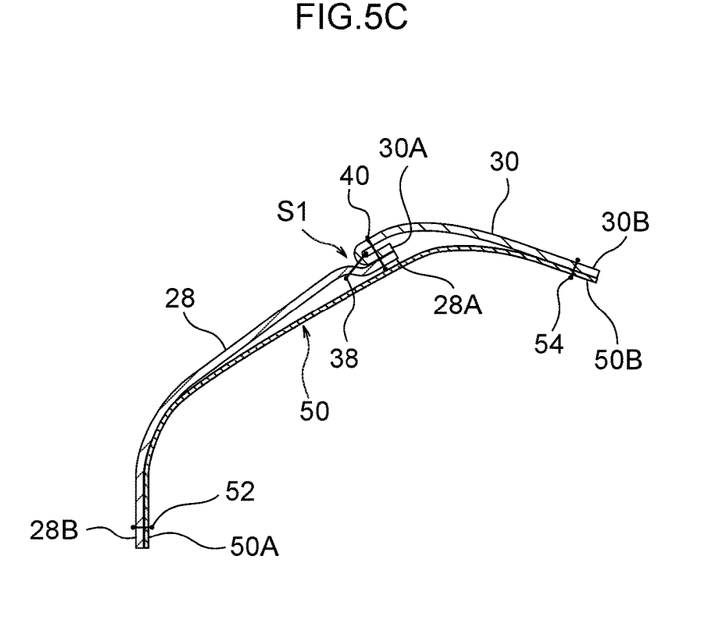
FIG. 5C is a cross-section illustrating a third process of the same sewing process.

Explanation follows regarding a stitching process (stitching sequence) of the covering pieces 24, 28, 30, 32 and the low friction cloth 50 described above, based on FIGS. 5A to 5E. As illustrated in FIG. 5A, in a first process, the seam allowance 28A of the covering piece 28 and the seam allowance 30A of the covering piece 30 are overlapped with each other and stitched together using the stitching thread 38. Next, as illustrated in FIG. 5B, in a second process, the seam allowances 28A, 30A are turned over toward the center side (the right side in FIG. 5B) of the covering piece 30, and are stitched together with a portion of the covering piece 30 that is adjacent to the seam allowance 30A using the stitching thread 40. Next, as illustrated in FIG. 5C, in a third process, the seam allowances 50A, 50B of the low friction cloth 50 are stitched (stay stitched) together with the seam allowances 28B, 30B of the covering pieces 28, 30 using the stitching threads 52, 54.

Figure 5D:
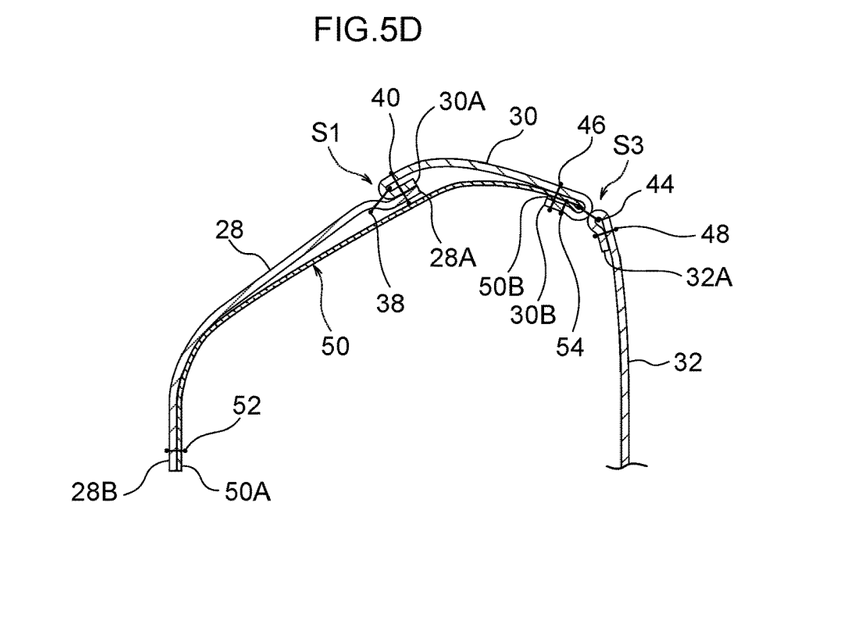
FIG. 5D is a cross-section illustrating a fourth process of the same sewing process.
Figure 5E:
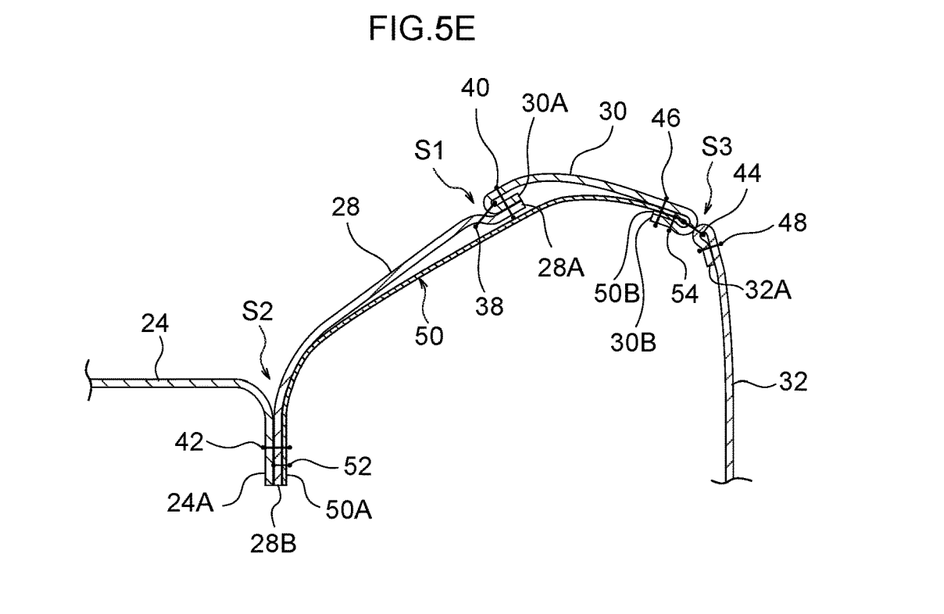
FIG. 5E is a cross-section illustrating a fifth process of the same sewing process.

Next, as illustrated in FIG. 5D, in a fourth process, the seam allowances 30B, 50B of the covering piece 30 and the low friction cloth 50 are overlapped with the seam allowance 32A of the covering piece 32 and stitched together using the stitching thread 44. Next, as illustrated in FIG. 5E, in a fifth process, the seam allowances 30B, 50B of the covering piece 30 and the low friction cloth 50, and the seam allowance 32A of the covering piece 32, are folded back toward opposite sides to each other, and portions on either side of the folds are stitched together using the stitching threads 46, 48. Also in the fifth process, the seam allowances 28B, 50A of the covering piece 28 and the low friction cloth 50 are overlapped with the seam allowance 24A of the covering piece 24 and the non-illustrated seam allowance of the covering piece 26, and are stitched together using the stitching thread 42. Note that although the hanger pocket 120 is not illustrated in FIGS. 5C to 5E, the hanger pocket 120 is stitched together with the seam S2 in the third and fifth processes. Explanation follows regarding configuration of the seatback 18.

Configuration of Seatback

As illustrated in FIG. 1, a backrest section 18A that supports the lumbar region and back of the occupant from the vehicle rear side is provided at the vehicle width direction center side of the seatback 18. Left and right side support sections 18B, 18C are respectively provided at either vehicle width direction side of the backrest section 18A. The left and right side support sections 18B, 18C jut out further toward the vehicle front side than the backrest section 18A, and are configured so as to support the lumbar region and back of the occupant from the sides.

Figure 6:
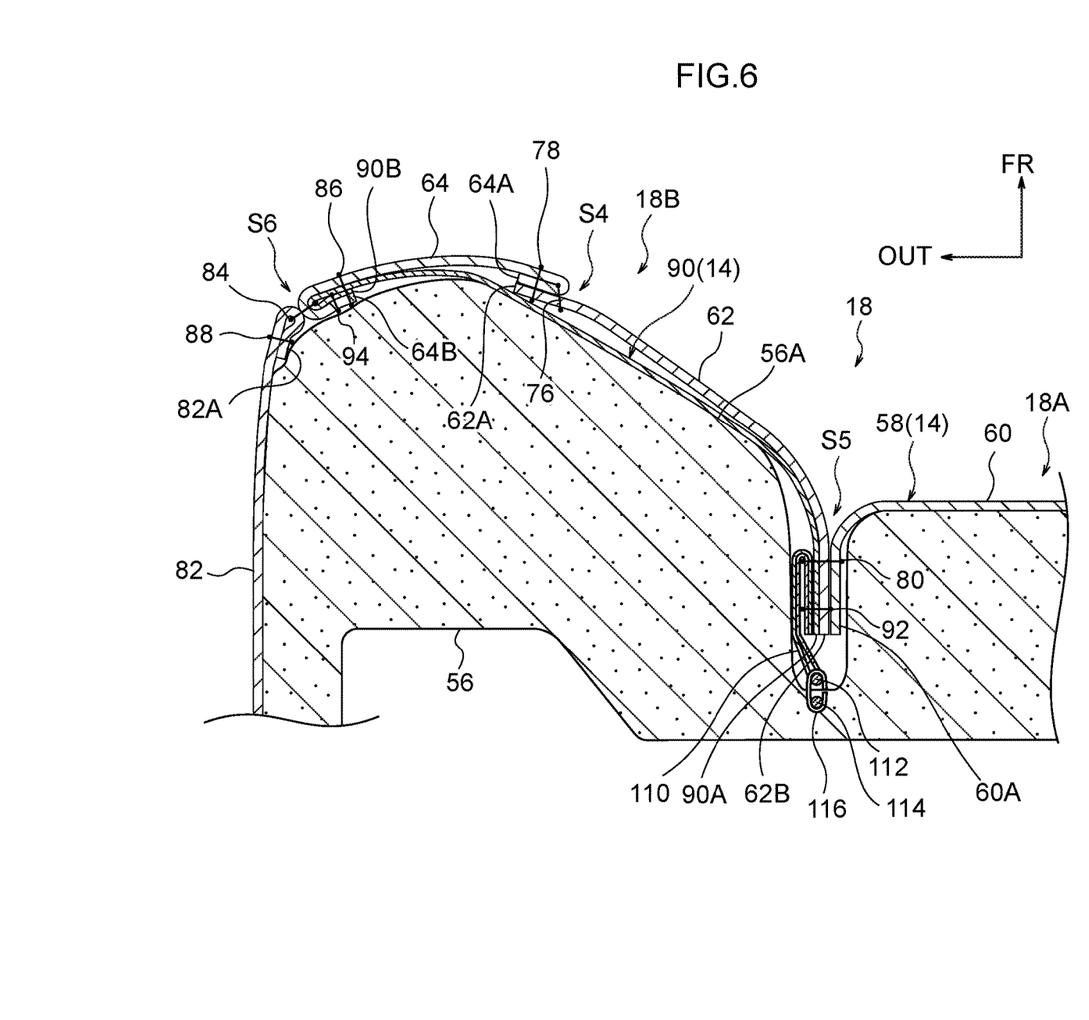
FIG. 6 is a cross-section corresponding to a cross-section sectioned along line F6-F6 in FIG. 1.

As illustrated in FIG. 6, the seatback 18 includes a seatback pad 56, this being a padding material (cushioning material). The seatback pad 56 is supported by a seatback frame, not illustrated in the drawings, configuring a frame of the seatback 18. The seatback pad 56 is covered by a cover main body 58, configuring a main body section of the seatback cover 14.

Figure 7:
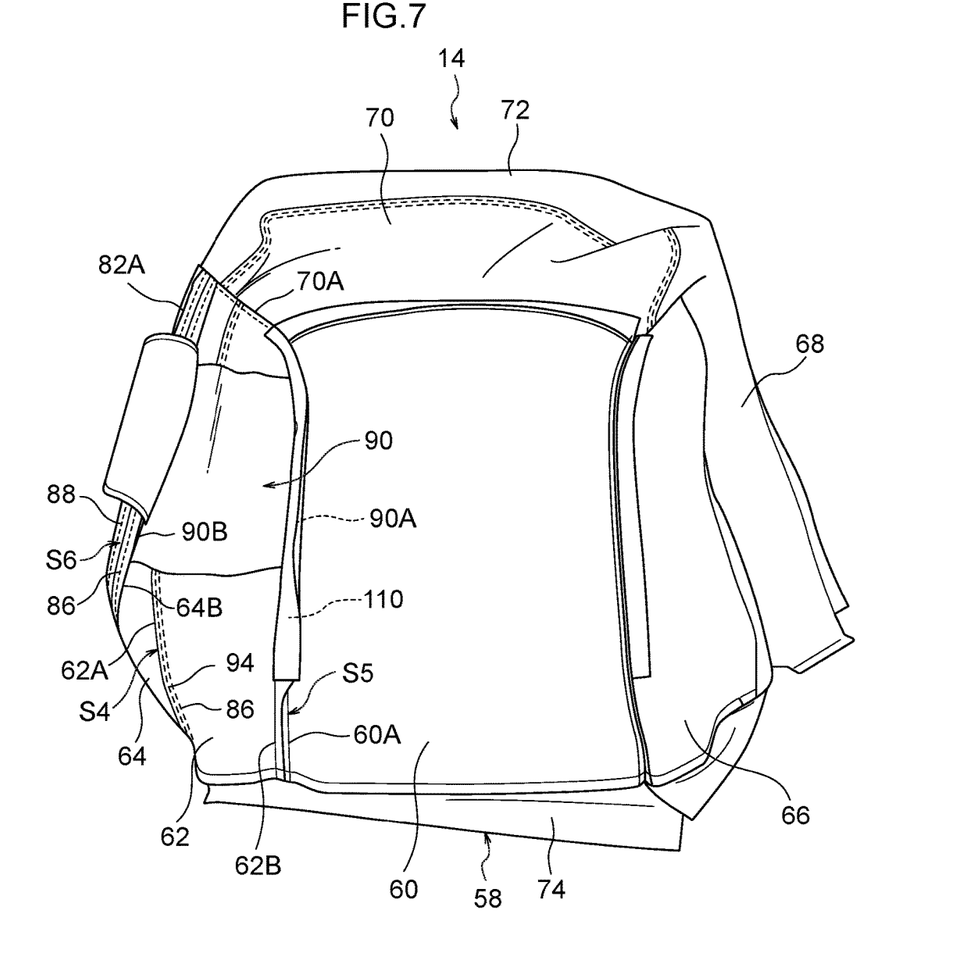
FIG. 7 is a perspective view of a seatback cover viewed from a back face side.

The cover main body 58 is formed in a bag shape by stitching together plural covering pieces, including covering pieces 60, 62, 64, 66, 68, 70, 72, and 74 illustrated in FIG. 7, at plural seam allowances disposed at a back face side of the cover main body 58. The cover main body 58 is stitched into a bag shape in a reversed state by stitching the plural covering pieces together in a reversed state. The front and back of the reversed-state cover main body 58 are then inverted while covering the seatback pad 56. Note that cloth, leather, synthetic leather, or another material is applied as the material of the plural covering pieces.

In the state in which the cover main body 58 covers the seatback pad 56, a surface (front face) of the side support section 18B disposed at the vehicle width direction outer side is configured by the pair of covering pieces 62, 64 that are side-by-side in the seat width direction (vehicle width direction). The pair of covering pieces 62, 64 are stitched (joined) together at a seam S4 extending along the length direction of the side support section 18B (vehicle up-down direction). As illustrated in FIG. 6, a seam allowance 62A provided at a seat width direction outer side edge of the covering piece 62 and a seam allowance 64A provided at a seat width direction inner side edge of the covering piece 64 are overlapped with each other and stitched together using stitching thread 76. The seam allowances 62A, 64A extend at a vehicle width direction intermediate portion of the side support section 18B along a direction (the vehicle up-down direction) intersecting the vehicle width direction, and are set at a front face of the side support section 18B, this being a same styling face that is continuous without steps or bends.

The seam allowances 62A, 64A are turned (folded) over toward the vehicle width direction outer side so as to lie along a surface 56A of the seatback pad 56, and are stitched together with a portion of the covering piece 64 that is adjacent to the seam allowance 64A using stitching thread 78. The stitching thread 78 configures single stitching extending in the vehicle up-down direction along the seam S4, and serving as a decorative stitch enhancing the design of the seatback cover 14. Note that a (non-stitched) configuration in which the stitching thread 78 is omitted may be adopted.

From out of the pair of covering pieces 62, 64, the covering piece 62 positioned at the seat width direction inner side is disposed adjacent to the covering pieces 60, 70 configuring a surface of the backrest section 18A, and is stitched together with the covering pieces 60, 70 at a seam S5. A seam allowance 60A provided at a seat width direction outer side edge of the covering piece 60 and a seam allowance 70A (see FIG. 7) provided at a seat width direction outer side edge of the covering piece 70 are respectively overlapped with a seam allowance 62B provided at a seat width direction inner side edge of the covering piece 62, and stitched thereto using stitching thread 80.

From out of the pair of covering pieces 62, 64, the covering piece 64 positioned at the seat width direction outer side is disposed adjacent to a covering piece 82 configuring a side face of the seatback 18, and is stitched together with the covering piece 82 at a seam S6. A seam allowance 64B provided at a seat width direction outer side edge of the covering piece 64 and a seam allowance 82A provided at a front edge of the covering piece 82 are overlapped with each other at the seam S6 and stitched together using stitching thread 84. The seam allowance 64B of the covering piece 64 is folded back toward the seat width direction inner side, and portions on either side of the fold are stitched together using stitching thread 86. Similarly, the seam allowance 82A of the covering piece 82 is folded back toward the rear side, and portions on either side of the fold are stitched together using stitching thread 88. The stitching threads 86, 88 configure double stitching extending in the vehicle up-down direction along the seam S6, and serving as a decorative stitch enhancing the design of the seatback cover 14.

A low friction cloth 90, configuring the seatback cover 14 together with the cover main body 58, is interposed between the pair of covering pieces 62, 64 and the seatback pad 56 at a back face side of the pair of covering pieces 62, 64. The low friction cloth 90 is formed by cutting the same tricot fabric used for the low friction cloth 50 into a substantially rectangular shape. Note that the material employed as the low friction cloths 50, 90 is not limited to tricot fabric, and an inexpensive cloth form, or sheet form (planar form), material may be employed, such as non-woven fabric, clothing fabric, or thinned leather.

The low friction cloth 90 is set with a smaller vehicle up-down direction dimension than the side support section 18B, and is disposed at a length direction intermediate portion (vehicle up-down direction intermediate portion) of the side support section 18B. A seam allowance 90A provided at a vehicle width direction inner side edge of the low friction cloth 90 is stitched together (sewn together) with the covering pieces 60, 62 using the stitching thread 80 at the seam S5, and also stitched (stay stitched) together with the seam allowance 62B of the covering piece 62 using stitching thread 92. Note that a hanger pocket 110 is stitched together using the stitching threads 80, 92 at the seam S5. A wire 112 that extends along the up-down direction of the seatback 18 is inserted through the hanger pocket 110. The wire 112 is coupled and fixed to a separate wire 114 extending along the up-down direction of the seatback 18 by hog rings 116. The wire 114 is embedded in the seatback pad 56 by foaming as an integral unit.

A seam allowance 90B provided at a vehicle width direction outer side edge of the low friction cloth 90 is stitched together (sewn together) with the covering pieces 64, 82 using the stitching thread 84 at the seam S6. The seam allowance 90B is stitched (stay stitched) together with the seam allowance 64B of the covering piece 64 using stitching thread 94, folded back together with the seam allowance 64B of the covering piece 64 toward the seat width direction inner side, and portions on either side of the fold are stitched together using the stitching thread 86.

Thus, the low friction cloth 90 spans between the seams S5, S6. A coefficient of friction of the surface of the low friction cloth 90 that contacts the covering pieces 62, 64 including the seam allowances 62A, 64A is set lower than a coefficient of friction of the surface 56A of the seatback pad 56. An example of a method to measure the coefficient of friction may be found in JIS K7125 (coefficient of friction measuring method of plastic film and sheet). Note that stitching processes of the covering pieces 60, 62, 64, and 82 and of the low friction cloth 90 are similar to those of the stitching processes of the covering pieces 24, 28, 30, and 32 and of the low friction cloth 50 (see FIGS. 5A to 5E), and so explanation is omitted.

Operation and Advantageous Effects

Explanation follows regarding operation and advantageous effects of the present exemplary embodiment. Note that the seat cushion cover 12 and the seatback cover 14 according to the present exemplary embodiment obtain basically the same operation and advantageous effects as each other, and so explanation follows regarding operation and advantageous effects of the seat cushion cover 12, whereas explanation regarding operation and advantageous effects of the seatback cover 14 is omitted.

In the seat cushion cover 12 of the vehicle seat 10 with the above configuration, the cover main body 22 is formed by stitching together plural covering pieces at their respective seam allowances. In the state in which the cover main body 22 covers the seat cushion pad 20 of the seat cushion 16, the seam allowances 28A, 30A disposed at a back face side of the cover main body 22 are turned over to lie along the surface 20A of the seat cushion pad 20. The low friction cloth 50 is attached to the back face side of the cover main body 22 in a state straddling across the seam allowances 28A, 30A. The low friction cloth 50 is interposed between the cover main body 22 and the seat cushion pad 20, and the coefficient of friction of the surface of the low friction cloth 50 contacting the seam allowances 28A, 30A is set lower than the coefficient of friction of the surface 20A of the seat cushion pad 20. Thus, even in cases in which the seam allowances 28A, 30A have been stand up unintentionally due to the body (such as the buttocks) of the occupant repeatedly rubbing against the surface of the cover main body 22, the seam allowances 28A, 30A can be returned to their original lying down state due to the seam allowances 28A, 30A sliding against the low friction cloth 50. This enables the seam allowances 28A, 30A to be prevented or suppressed from remaining in a stand up state.

Figure 8:
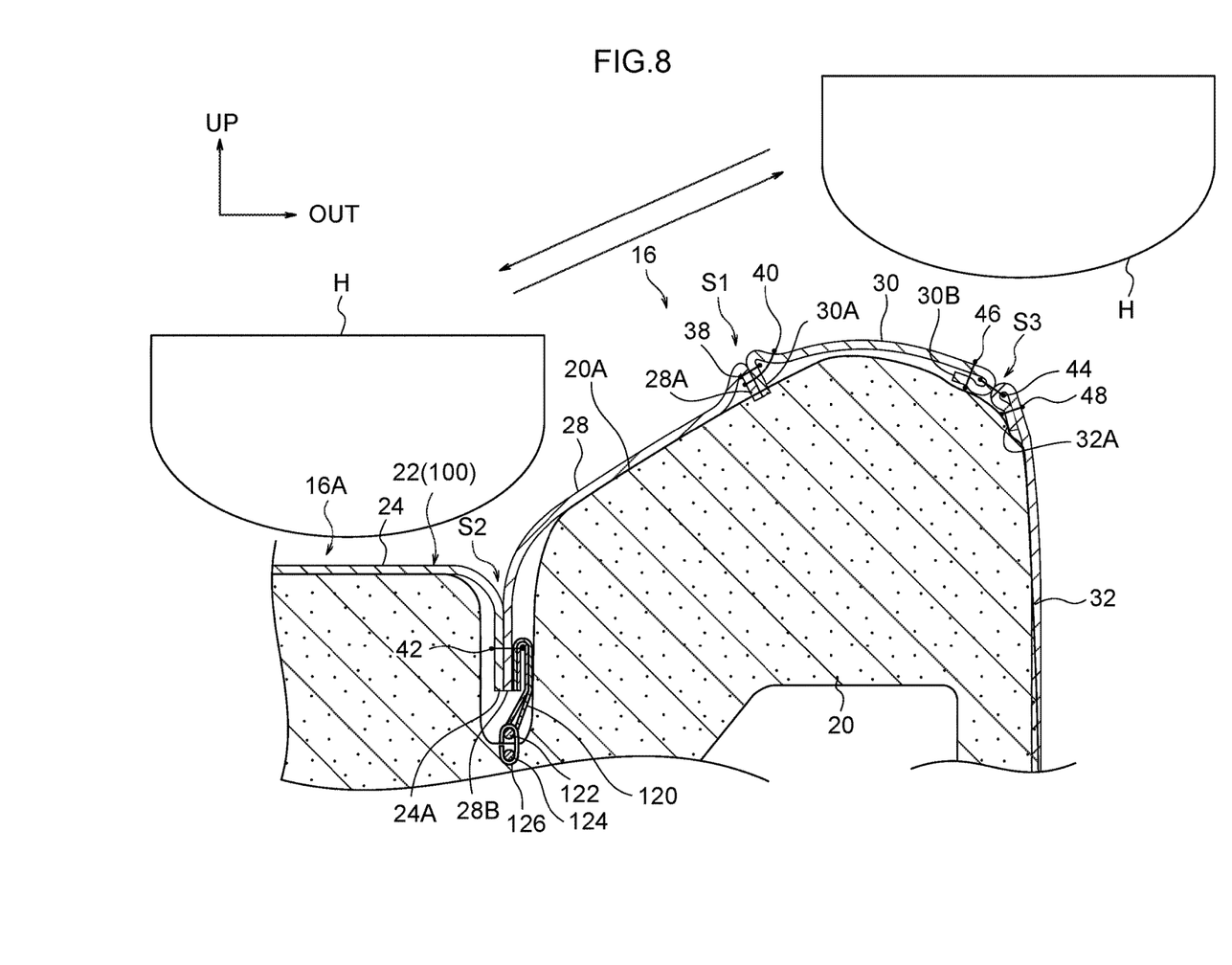
FIG. 8 is a cross-section corresponding to FIG. 2, illustrating a comparative example to an exemplary embodiment of the present invention.
Figure 9:
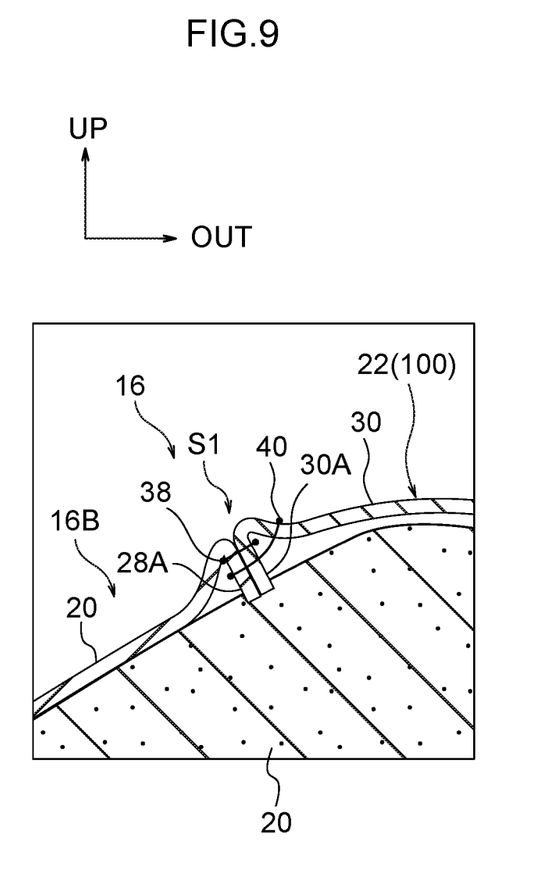
FIG. 9 is an enlarged cross-section of part of FIG. 8.

Supplementary explanation follows regarding the above advantageous effect, with reference to a seat cushion cover 100 (a comparative example) illustrated in FIGS. 8 and 9. The seat cushion cover 100 does not include the low friction cloth 50 according to the present exemplary embodiment; however, other configuration is similar to that of the seat cushion cover 12. Note that in FIGS. 8 and 9, similar configuration to that of the present exemplary embodiment is appended with the same reference numerals.

In the seat cushion cover 100, in cases in which the seam allowances 28A, 30A have been stood up unintentionally due to the buttocks of the occupant (see the hip shape H in FIG. 8) repeatedly rubbing against the surface of the cover main body 22, leading ends of the seam allowances 28A, 30A dig into the surface 20A of the seat cushion pad 20, such that the seam allowances 28A, 30A are sometimes retained in a stood up state. In such cases, as illustrated in FIGS. 8 and 9, the quality of the external appearance of the seat cushion 16 is reduced due to the seam S1 bulging outward. Moreover, the resistance to the occupant boarding and alighting is increased due to the clothing of the occupant rubbing against the protruding seam S1 when the occupant is boarding and alighting the vehicle.

Regarding this point, in the present exemplary embodiment, the low friction cloth 50 is interposed between the seam allowances 28A, 30A and the seat cushion pad 20, so that even when the seam allowances 28A, 30A have been stood up unintentionally due to the buttocks of the occupant (see the hip shape H in FIG. 2) repeatedly rubbing against the surface of the cover main body 22 or the like, the leading ends of the seam allowances 28A, 30A are prevented or suppressed from digging into the surface of the seat cushion pad 20. Thus, due to the low friction cloth 50, the seam allowances 28A, 30A can be prevented or suppressed from remaining in the stood up state, enabling the above-described reduction in the quality of the external appearance, and the increase in resistance to the occupant boarding and alighting, to be avoided.

Note that the seam allowances 28A, 30A might be prevented from being stood up unintentionally by adopting a configuration in which double stitching, such as the stitching threads 46, 48 at the seam S3, is set at both sides of the seam S1, and portions of the covering pieces 28, 30 that are adjacent to the seam allowances 28A, 30A are respectively stitched together at the seam allowances 28A, 30A. However, the degrees of freedom of design would be decreased by setting double stitching. Regarding this point, in the present exemplary embodiment, a single stitching or stitchless design may be employed, thereby enabling the degrees of freedom of design to be increased.

In the present exemplary embodiment, the seam allowances 28A, 30A that have been turned over to lie along the seat cushion pad 20 are provided to the side support section 16B disposed at the vehicle width direction outer side of the seat cushion 16, and extend along the vehicle front-rear direction at the vehicle width direction intermediate portion of the side support section 16B. In such a configuration, the seam allowances 28A, 30A are liable to stand up on end due to the buttocks of the occupant repeatedly rubbing against the side support section 16B when the occupant is boarding and alighting the vehicle. However, due to the low friction cloth 50 in the present exemplary embodiment, as described above, the stood up seam allowances 28A, 30A can be returned to their original lying down state.

In the present exemplary embodiment, the low friction cloth 50 is provided disposed at the length direction intermediate portion (the front-rear direction intermediate portion) of the side support section 16B disposed at the vehicle width direction outer side. The front-rear direction intermediate portions of the stood up seam allowances 28A, 30A less readily return naturally to their original lying down state than both front-rear direction end portions of the side support section 16B. However, due to the low friction cloth 50 in the present exemplary embodiment, the stood up seam allowances 28A, 30A can be returned to the original lying down state. Moreover, the low friction cloth 50 can be made smaller than in cases in which the low friction cloth 50 is provided across the entire length direction range of the side support section 16B, thereby enabling a reduction in costs to be achieved.

In the present exemplary embodiment, the seam allowances 50A, 50B respectively provided at either vehicle width direction edge of the low friction cloth 50 are sewn together with the seam S2 between the covering pieces 24, 26, and 28, and with the seam S3 between the covering pieces 30, 32. This enables the attachment operation of the low friction cloth 50 to the cover main body 22 to be completed during the stitching process of the seams S2, S3. This enables manufacture to be more efficient.

In the present exemplary embodiment, the low friction cloth 50 comprises an inexpensive tricot fabric of synthetic fibers, thereby enabling a reduction in costs to be achieved. Note that the seatback cover 14 includes the low friction cloth 90 that is similar to the low friction cloth 50 of the seat cushion cover 12, thereby enabling similar operation and advantageous effects to those for the seat cushion cover 12 to be exhibited.

Additional Explanation of Exemplary Embodiment

In the above exemplary embodiment, configuration is such that the seam allowances 50A, 50B of the low friction cloth 50 are sewn together with the seam S2 between the covering pieces 24, 26, and 28 and with the seam S3 between the covering pieces 30, 32, and the seam allowances 90A, 90B of the low friction cloth 90 are sewn together with the seam S5 between the covering pieces 60, 62, 70 and with the seam S6 between the covering pieces 64, 82. However, the present invention is not limited thereto, and the attachment method of the low friction cloths 50, 90 to the cover main bodies 22, 58 may be modified as appropriate. For example, a low friction cloth may be configured attached to a cover main body by a means such as adhesive or a stapler.

In the above exemplary embodiment, configuration is such that the seam allowances 50A, 50B of the low friction cloth 50 are stay stitched to the covering pieces 28, 30 using the stitching threads 52, 54, and the seam allowances 90A, 90B of the low friction cloth 90 are stay stitched to the covering pieces 62, 64 using the stitching threads 92, 94. However, the present invention is not limited thereto, and configuration may be such that the stitching threads 52, 54, 62, and 64 are omitted.

In the above exemplary embodiment, a case has been explained in which the vehicle seat 10 is disposed at the left side inside a vehicle cabin; however, there is no limitation thereto, and a vehicle seat according to the present invention may be configured disposed at the right side inside the vehicle cabin. In such cases, the configuration of the seat cushion cover and the seatback cover has left-right symmetry to the above exemplary embodiment. The vehicle seat may also be configured as a seat seating three people with its length along the vehicle width direction.

Various other modifications may be implemented within a range not departing from the spirit of the present invention. Obviously the scope of rights of the present invention is not limited by the above exemplary embodiment.

What is claimed is:

1. A seat cover, comprising:
   a cover main body that is formed by stitching together at a stitch a plurality of covering pieces, and that covers a padding material of a vehicle seat, each of the plurality of covering pieces having an edge and an end portion extending from the stitch to the edge, at least one end portion of the plurality of covering pieces being folded over towards a back face side of the cover main body so that a first surface of the at least one end portion is adjacent to the back face side and a second surface of the at least one end portion faces in a direction towards the padding material; and
   a low friction cloth that is attached to the back face side of the cover main body in a state slidably covering the end portion of each of the plurality of covering pieces, and that is interposed between the cover main body and the padding material, with a surface of the low friction cloth that contacts at least one end portion of the plurality of covering pieces having a lower coefficient of friction than a coefficient of friction of the surface of the padding material.

2. The seat cover of claim 1, wherein:
   in a state in which the cover main body covers the padding material, a pair of the plurality of covering pieces stitched together at the at least one end portion configures a surface of a side support section disposed at a vehicle width direction outer side of a seat cushion or a seatback of the vehicle seat; and
   the at least one end portion extends, at a vehicle width direction intermediate portion of the side support section, along a direction intersecting the vehicle width direction.

3. The seat cover of claim 2, wherein the low friction cloth is disposed at a length direction intermediate portion of the side support section.

4. The seat cover of claim 1, wherein each edge of the low friction cloth is sewn together with a seam between the respective covering pieces.

5. The seat cover of claim 1, wherein the low friction cloth comprises a tricot fabric of synthetic fibers.

6. A vehicle seat, comprising:
   at least one of a seat cushion cover to cover a seat cushion pad serving as a padding material of a seat cushion, or a seatback cover to cover a seatback pad serving as a padding material of a seatback, configured by the seat cover of claim 1.

* * * * *